3,421,471
HATCH DOGGING AND SEALING MECHANISM
Philip Richter, Bethlehem, Pa., assignor to Fuller Company, Catasauqua, Pa., a corporation of Delaware
Filed July 27, 1967, Ser. No. 656,508
U.S. Cl. 114—203                                13 Claims
Int. Cl. B63b 3/48; E06b 3/48

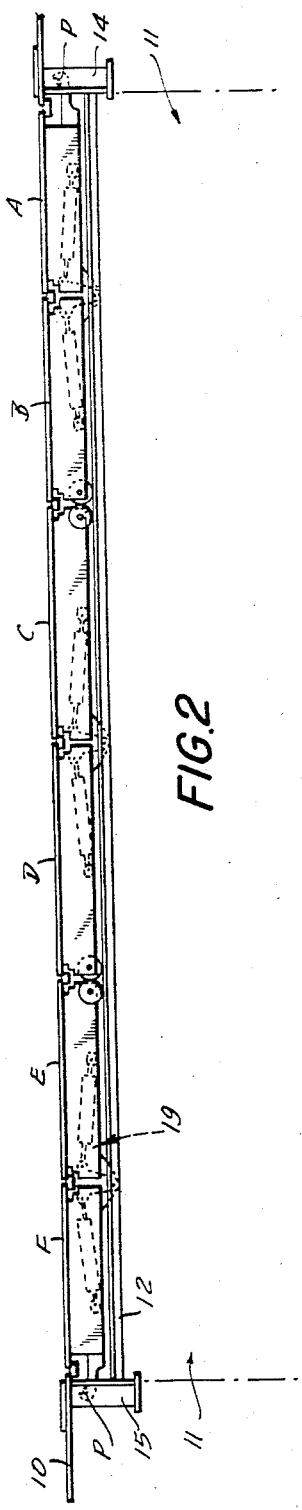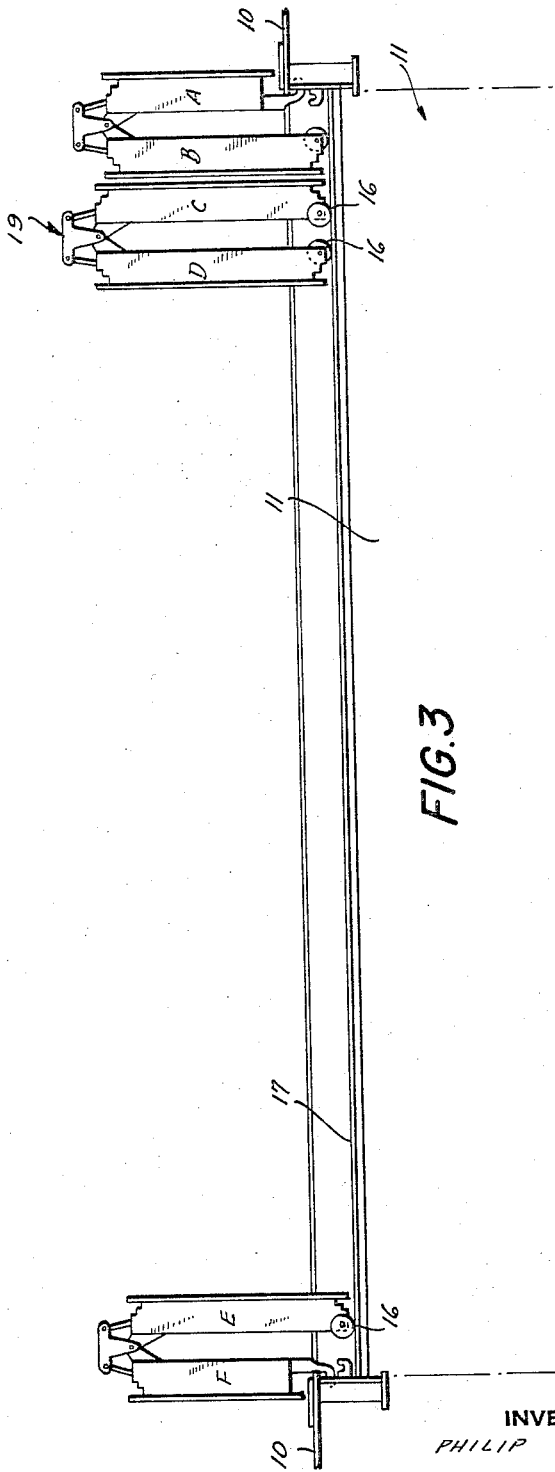

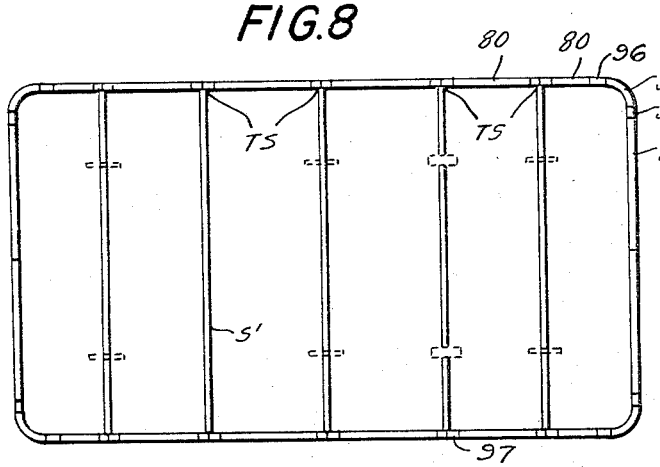
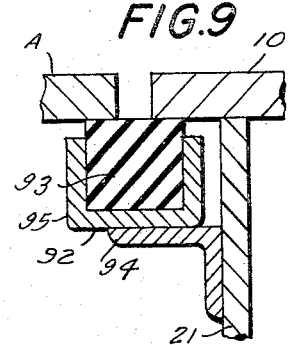
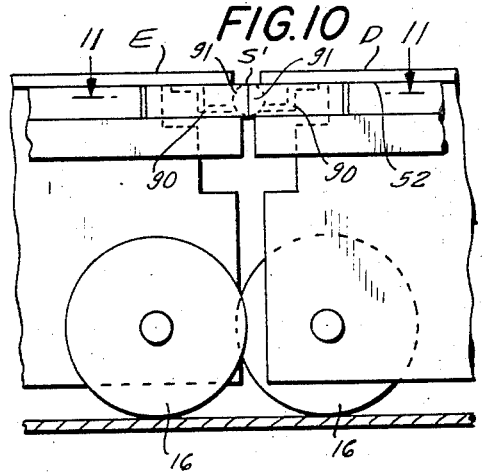
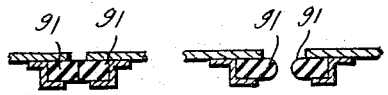
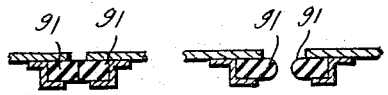
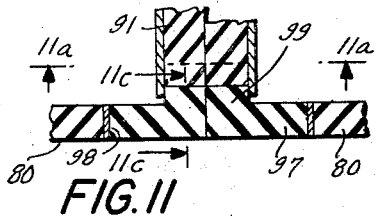
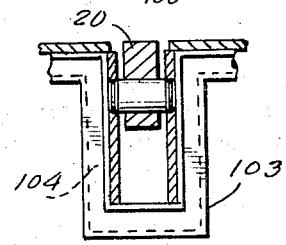
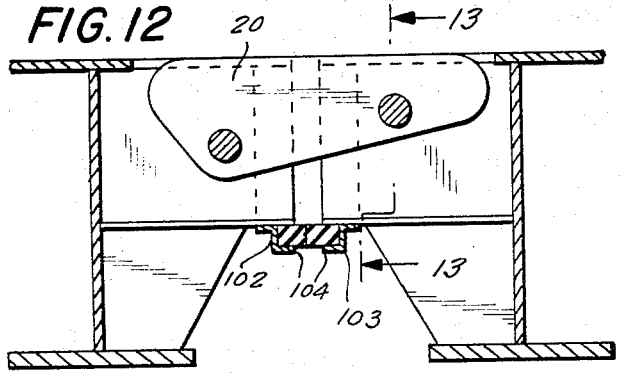

ABSTRACT OF THE DISCLOSURE

A hatch dogging and sealing mechanism having a multiplicity of movable gasket strip carrier members, movably mounted on hatch cover panels, the carriers being actuated by suitable actuating means for shifting the carriers and gasket strips between sealing and unsealing positions of the space defined between the juxtaposed edges, respectively, of a hatch opening and a hatch panel, the carriers being connected to the actuating means by linkage which is shifted to passed dead center in sealing position, whereby the gasket is maintained in compressed condition, sealing said peripheral space and locking said panels in closed position.

BACKGROUND OF THE INVENTION

Field of the invention

This invention relates to hatch constructions and more particularly to multiple panel, flush deck hatch covers.

More particularly, the invention relates to dogging and sealing means whereby the space between hatch panels of the type described and the hatchway formed through the deck of a ship or the like may be securely sealed against the admission to the interior of the hatch, of water, debris and the like.

Description of the prior art

The provision of a watertight seal between a hatch cover and a hatchway, particularly in a flush deck marine hatch installation wherein the upper surface of the hatch cover is disposed in co-planar alignment with the deck surface, has presented considerable problems. Various means and types of gasket components, have been employed in an attempt to make the hatchway impervious to the admission of water, particularly sea water which is often forcibly directed against the hatchway under heavy sea conditions.

In hatch installations of the flush deck type, gasketing has presented a particular problem where the panels of a flush deck installation are required to be operated by complex drives and linkages which articulate the panels between open and closed positions in a compound moving path rather than in a simple pivotal or arcuate path.

Gasketing constructions heretofore known, particularly in flush deck installations, have caused difficulties in conjunction with avoiding chafing, abrasion or disfigurement of gasket components in the course of movement of the hatch panels between open and closed positions. Since such installations may incorporate panels of large size wherein each individual panel of the structure may weigh upwards of four tons and may measure 20 feet in length by 5 feet in width, it is obviously difficult in the installation of the panels to maintain the interfit between the panels and the walls defining the hatchway, within close tolerances. Thus, the provision of a watertight multipanel construction is complicated by the fact that variable clearances and spacings are inevitably experienced despite the utmost fabricating precautions.

Since considerable operating mechanism for the flush panel apparatus is disposed beneath the level of the deck, it is preferred that the actual seal be effected directly beneath the deck surface so as to protect not only the cargo in the hold but also the operating linkage for opening and closing the hatch structures.

A further complication in gasketing flush deck hatch type installations is that the hatch panels must swing through the plane occupied by the seals, a factor which augments the likelihood of damage to the seals previously alluded to.

The use of movable dogs which extend across the plane of the seals externally of the panels presents many drawbacks, including interruption of the smooth surface desired and exposure to corrosion and rusting.

Summary of the invention

The present invention relates to a dogging and sealing apparatus for hatch covers generally, particularly effective for use in conjunction with flush deck hatch cover installations and incorporating movable seal members which are carried by the hatch panels and which effect seals at all points about the periphery of the hatchway with the exception of the corner portions, which corner portions are optionally but preferably carried by the deck stucture, and which also secuely retains the hatch panels in closed position. The hatch panels, which are typically mounted on roller components slidably supported on a track mounted beneath the deck, carry hydraulic actuators which act through novel linkage mechanism to advance gasket portions upwardly into sealing position of the space defined between the juxtaposed deck and panel edges at all but said corner portions.

The movable gaskets are associated with stationary gaskets carried by the panels themselves to provide inter-panel seals to form a continuous seal arrangement, the pressure exerted by the upwardly shiftable gaskets also forcing the panels against the supporting structure therefor to lock the panels in closed position.

Novel linkage mechanism incorporating a passed dead center orientation of the linkage in the sealed position of the hatchway is coordinated with a hydraulic actuator of the linear type so that when the actuator components are in a fully expanded limit position, the passed dead center position of the linkages is achieved and the gasket or seal is tightly compressed and the panels are locked in position. This arrangement serves to maintain the seals or gaskets in the compressed position so that hydraulic pressure in the actuator means may be discontinued without compromising the seal or locking of the panels.

It is, accordingly, an object of this invention to provide an improved seal and dogging actuator for a hatch assembly, and particularly a flush deck hatch assembly.

It is further an object of the invention to provide an improved flush deck hatch assembly having a gasketing arrangement which is resistant to abrasion in use and, accordingly, has a long life expectancy, minimizing the need to change or repair the gasket components.

A further object of the invention is to provide a hatch assembly of the type described provided with improved sealing and dogging means, preventing the ingress of water through the hatchway, the seal being effected directly beneath the deck structure, thereby protecting not only the cargo in the hold but also the hatch panels operating linkages and mechanism.

In the accompanying drawings in which is shown one of various possible embodiments of the several features of the invention.

FIG. 2 is a side elevational view of the hatch structure shown in FIG. 1;

FIG. 3 is a view similar to FIG. 2, showing the hatch panels in the folded or hatchway opened position;

FIG. 8 is a diagrammatic plan view showing the position of all of the seal components in the closed position of the hatch;

FIG. 9 is a sectional view on an enlarged scale of the corner seal taken along line 9—9 of FIG. 1;

FIG. 10 is a sectional view taken on an enlarged scale along line 10—10 of FIG. 1;

FIG. 11 is a sectional view on an enlarged scale taken along line 11—11 of FIG. 10;

FIGS. 11a and 11b are sectional views taken along line 11a—11a of FIG. 11, showing the position of the seal members respectively in the sealed position and in position just prior to sealing;

FIG. 11c is a sectional view taken on the line 11c—11c of FIG. 11;

FIG. 12 is a sectional view taken along line 12—12 of FIG. 1, and

FIG. 13 is a sectional view taken along line 13—13 of FIG. 12.

Figure 1:
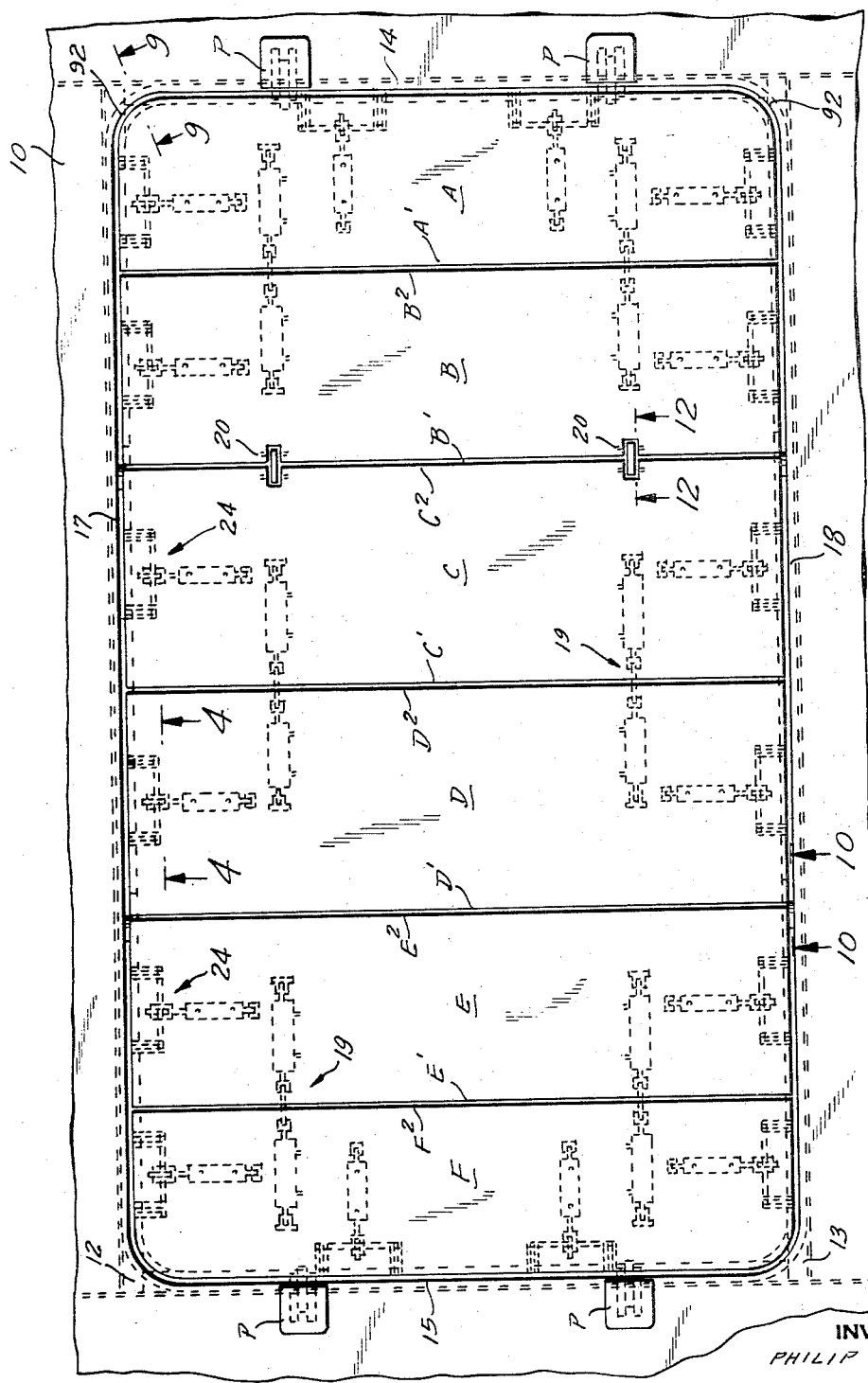
FIG. 1 is a plan view of the deck section showing a hatchway with a hatch cover positioned in closed relation thereto, components of the hatch seal forming mechanism being shown in broken lines.
Figure 4:
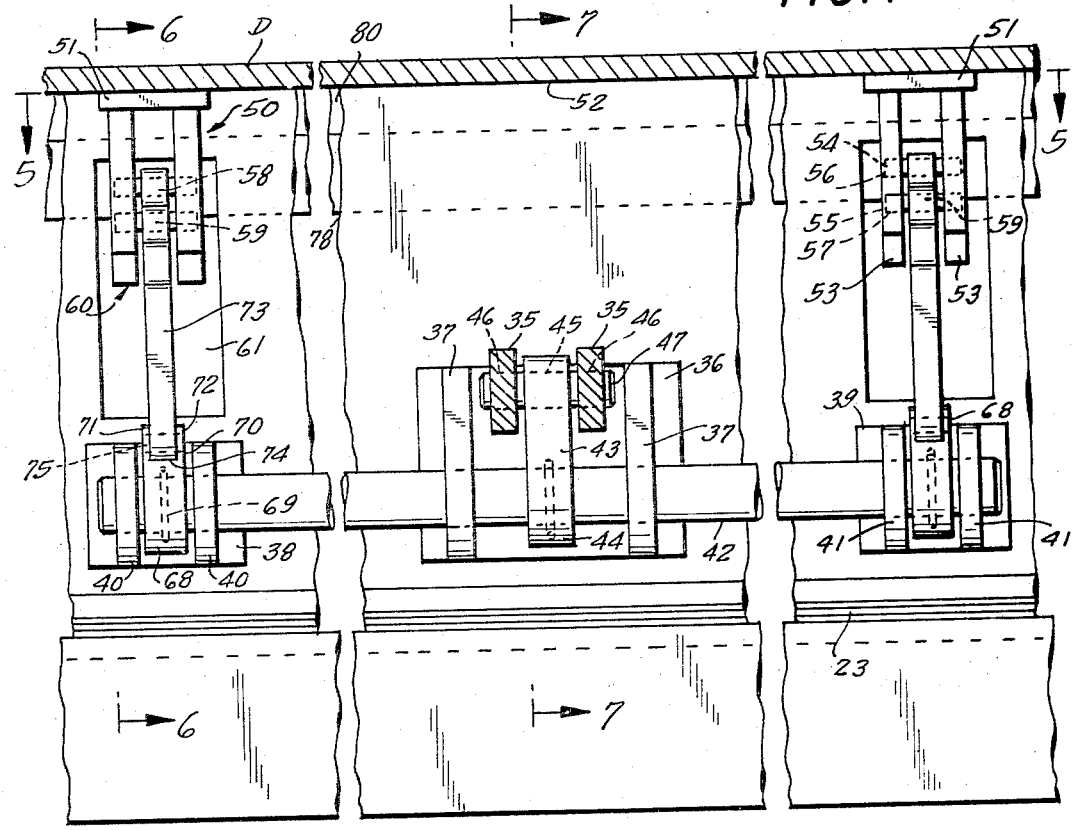
FIG. 4 is a sectional view on an enlarged scale taken along line 4—4 of FIG. 1.

Referring now to the drawings, there is defined in the deck 10 of a ship a substantially rectangular hatchway 11 designed to be closed by two sets of hingedly connected hatch panels of generally rectangular configuration, one set of panels, designated A, B, C and D, being movable to the right as shown in FIG. 1, and the other set designated E and F being movable to the left, as viewed in FIG. 1.

Depending from the deck 10 and defining the longitudinal sides of the hatchway are a pair of lengthwise extending beams 12, 13, the ends of the hatchway being defined by transversely extending beams 14, 15.

As will be best appreciated from FIGS. 2 and 3, the hatch panels may be articulated from the closed position shown in FIG. 2 to the open or booked position shown in FIG. 3. As will be further appreciated from FIG. 2, the upper surfaces of the panels are disposed in substantial co-planar alignment with the deck 10 in the closed position, and are booked or stacked in vertical position in the open hatch position shown in FIG. 3.

The hatch panels B, C, D and E, which are not pivotally connected with an end portion of the hatchway as at P are provided with pairs of rollers 16 disposed adjacent the lateral edges of the panels, the rollers being guided on trackways 17, 18 of the beams 12, 13 respectively, to facilitate the movement of the panels between open and closed positions. The mechanism 19 for effecting the movement of the panels from the open to the closed position illustratively is of the type shown in Patent No. 3,043,257 and since it forms no part of the present invention, a detailed description thereof is not required.

It will, however, be understood that certain of the panels, notably panels B and C of the multi-panel structure comprising the panels A, B, C, D, which are not interconnected by the actuator mechanism 19, are linked by spaced hinges 20, 20 (Figs. 1 and 12).

The present invention relates to sealing and dogging mechanism which seals the hatchway against the ingress of moisture, debris and the like, when the hatch panels are disposed in the closed position shown in FIG. 2, said mechanism being adapted to be shifted clear of the edge portions of the hatch panels when it is desired to fold the panels to the position of FIG. 3.

Figure 6:
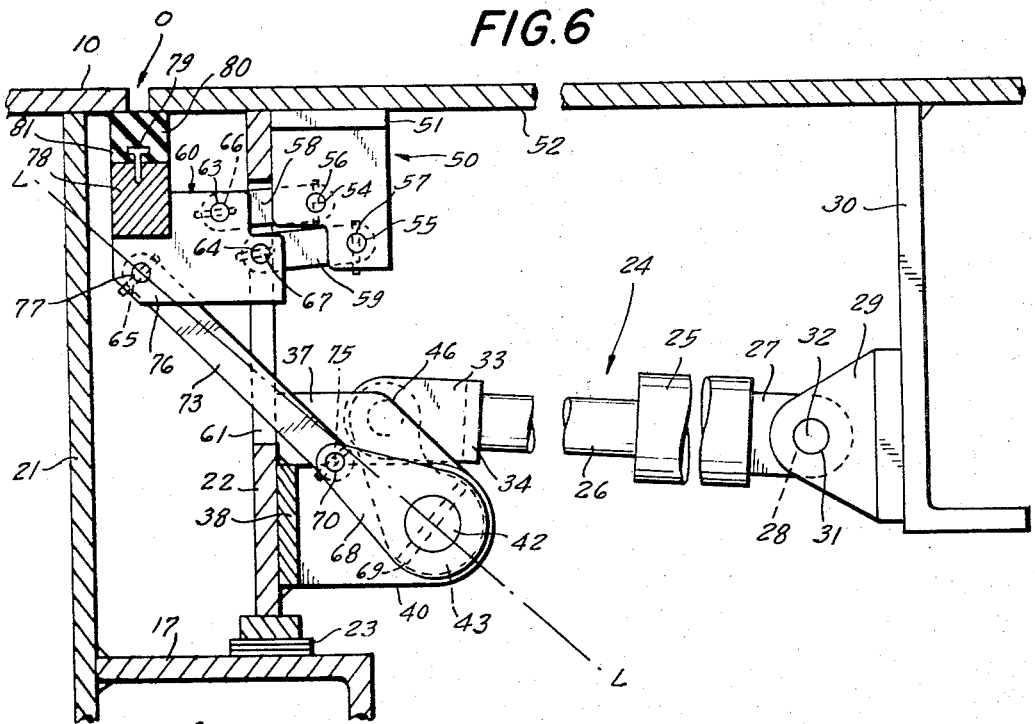
FIG. 6 is a vertical sectional view taken along line 6—6 of FIG. 4, showing the position of the hatch dogging mechanism in the sealed position of the parts.
Figure 7:
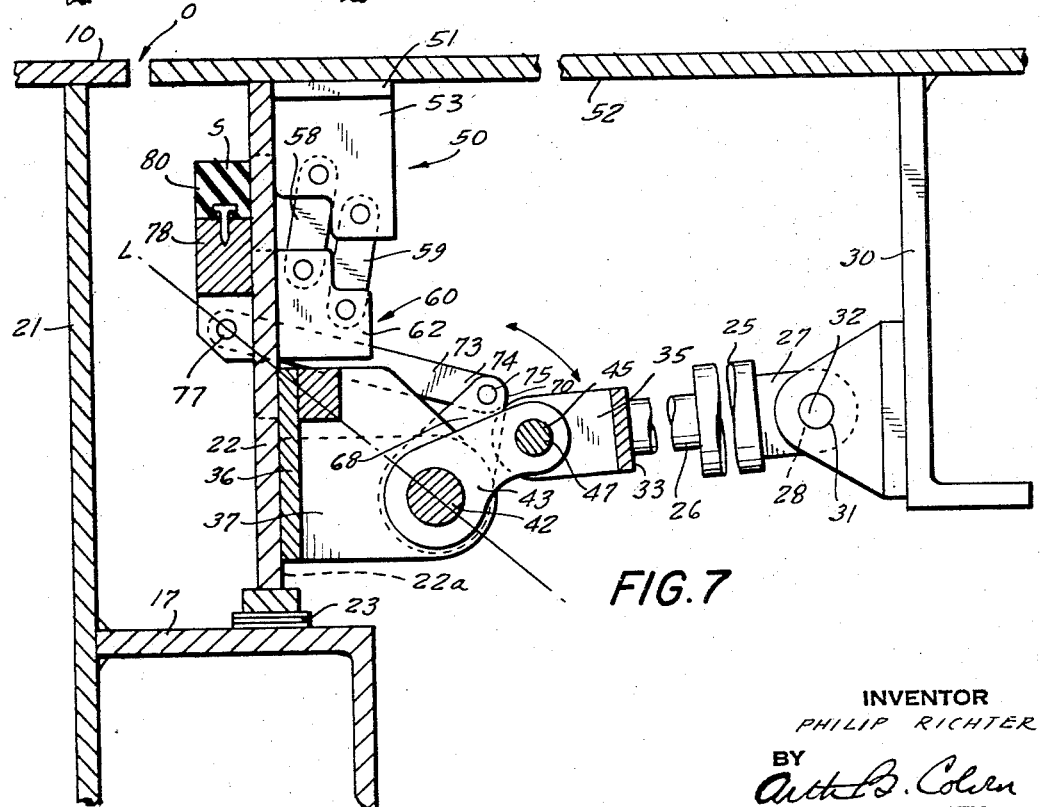
FIG. 7 is a vertical sectional view taken along line 7—7 of FIG. 4, showing the position of the parts of the sealing mechanism in the open position thereof.

As best seen in FIGS. 1, 6 and 7, the hatchway includes a suubstantially continuous deck beam 21 forming a continuation of the side beams 12, 13 and end beams 14, 15, defining the edges of the hatchway. The hatch panels, at the edges thereof adjacent the hatchway are provided with hatch skirt portions 22 which, in the closed position of the hatch, are disposed in parallel spaced relation to the deck beam 21. The lower edges of the hatch skirt portions 22 are provided with depending foot portions 23 which, in the closed position of the hatch panels, rest against the tracks 17, to aid in supporting the weight of the hatch panels.

In accordance with the present invention, there is provided a seal and dogging mechanism which effects tight seals between adjacent edges $A'-B^2$, $B'-C^2$, etc., of the hingedly connected hatch panels and also between the edges of the panels adjacent the periphery of the hatchway and the undersurface of the deck portion defining such periphery.

To effect the desired sealed relationship, there are provided a plurality of hatch seal actuator mechanisms 24 comprising hydraulic cylinders 25, having extendable piston members 26 shiftable between inner and outer limiting positions within the cylinders 25. A plurality of the actuators 24 are disposed in spaced-apart relation about the periphery of the hatch cover panels. Since the actuators are in all respects identical, a description of one will suffice.

The cylinders 25 are mounted by means of an ear 27 affixed to the passive end of the cylinder, i.e., the end opposite the end from which the piston 26 projects. The ear 27 is apertured at 28, the apertured portion of said ear being disposed between a pair of spaced bracket plates 29 fixed to vertical support beam 30 which parallels the hatch skirts 22.

The aperture 28 of ear 27 is positioned in registry with apertures 31 formed in plates 29 and a horizontally disposed cross pin 32 passing through apertures 28 and 31, pivotally connects the ear 27 to the plates 29.

To the opposite end of the piston rod 26 is affixed a clevis 33, linear adjustment means (not shown) being provided in the connection between the clevis to the piston rod. The clevis includes an end portion 34 affixed to the piston rod 26, from which end portion extends a pair of parallel side arms 35 formed with registering spaced apertures. A bifurcated bracket member 36 is welded or otherwise affixed to the inner face 22a of the hatch skirt 22 in opposed relation to the clevis 33.

The bracket 36 includes apertured side walls 37. Similarly, and to each side of the bracket 36, a pair of secondary brackets 38, 39 are welded to the inner face 22a of the hatch skirt 22, the brackets 38, 39 including vertically directed parallel side walls 40, 41 respectively. The side walls 37, 40 and 41 are provided with aligned bearing apertures, a longitudinally extended drive shaft 42 being rotatably disposed within the aligned bearing apertures in the side walls 37, 40 and 41.

A lever 43 is pinned to the shaft 42 by cross pin 44. The lever 43 is provided with an aperture 45 disposed between and in registry with apertures 46 formed in the side arms 35 of the clevis 33. Clevis pin 47 passes through the clevis arms 35 and the aperture 45 formed in the lever.

From the foregoing it will be evident that upon extension of the piston 26 from the hydraulic cylinder 25, the lever 43 will be pivoted counterclockwise from the position shown in FIG. 7 to the position shown in FIG. 6, causing a concomitant counterclockwise rotation of the drive shaft 42. Upon retraction of the piston 26 into the cylinder 25, a clockwise rotation of the lever and drive shaft 42 will be effected.

The seal gaskets proper are carried by seal carrier assemblies 50 (FIGS. 4, 5, 6, 7). Each of the carrier assemblies 50 includes mounting brackets 51 welded or otherwise secured to the undersurface 52 of the upper face of the hatch panels, the brackets including spaced, downwardly directed side plates 53.

The plates 53 are formed with horizontally and vertically spaced-apart bearing apertures 54, 54, 55, 55. Upper and lower cross pins 56, 57 are mounted within the opposed bearing apertures 54, 54, 55, 55, respectively. An upper parallelogram link 58 is mounted on pin 56, a lower link 59 being mounted on pin 57. A seal or gasket carrier member 60 is pivotally mounted on the links 58, 59. The hatch skirt 22 is apertured at 61 to provide clearance for the links 58, 59 and for the actuator components for the seal carrier hereinafter to be described.

Each carrier 60 includes spaced side plates 62, 62, provided with three sets of registering apertures 63, 64, 65. The parallelogram links 58, 59 are disposed between the side plates 62, the upper link 58 being fixed by cross pin 66 within the apertures 63, and the lower link 59 being secured by cross pin 67 within the apertures 64, the links 58, 59 being disposed in parallel relation.

It will be observed that the parallelogram linkage thus defined will permit pivotal movement of the carrier 60 with respect to the support bracket 51 while at all times maintaining the carrier in a predetermined parallel relation to the deck structure.

The seal carrier 60 is shifted between its sealing and retracted positions by actuator mechanism driven from the drive shaft 42. For this purpose a pair of actuator levers 68 are mounted on the drive shaft 42 between the arms 40, 40 of bracket 38 and the arms 41, 41 of bracket 39. The levers 68 are pinned, as by cross pins 69, to the drive shaft so as to rotate with the shaft.

The ends 70 of the levers 68 remote from connection with the drive shaft 42 are bifurcated at 71, the bifurcated end portions being provided with registering apertures 72. A reach arm 73 is apertured at its lower end 74 and connected to the lever 68 by a cross pin 75 extending through the aperture of the reach arm and the apertures 72 in the lever 68. The upper end 76 of the reach arm extends between the side plates 62 of the seal carrier 60, a cross pin 77 connecting the upper end of the reach arm with the two side plates.

From the foregoing it will be appreciated that a pair of spaced seal carriers 60, 60 operate in tandem from a single hydraulic actuator 25 which rotates drive shaft 42, the drive shaft being connected to the spaced carriers by complementary spaced reach arms 73. The carriers 60 are connected by a horizontally disposed carrier seal support block 78, made fast to upper surface portions of the side walls 62 of the seal carriers.

Figure 5:
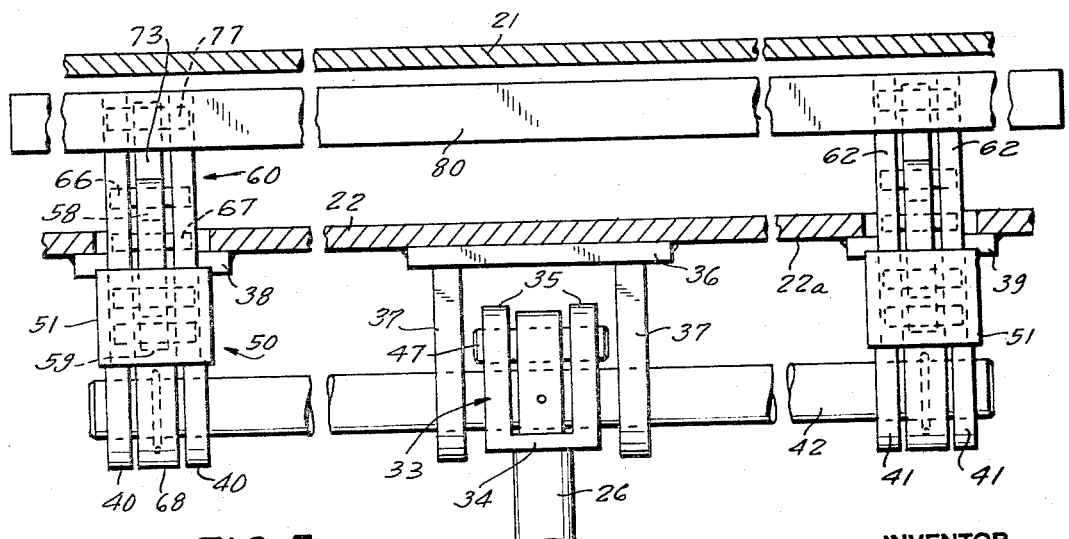
FIG. 5 is a sectional view taken along line 5—5 of FIG. 4.

Support block 78 includes an upwardly extending T section 79 which provides a connection for the replaceable gasket or seal 80. As best seen in FIGS. 5 and 6, the major portion of the gasket or seal section 80, which is preferably formed of a compressible elastomeric material, incorporates an internal, complemental T recess 81 which permits the seal member 80 to be removably seated on the T section 79.

OPERATION

Presuming the hatch panels to have been shifted to the closed position shown in FIG. 7, the actuators 25 may be energized to shift the seal components 80 to the dogging and sealing position wherein they tightly close the space or opening O, defined between the juxtaposed edge of the deck and the opposed edge surface of the hatch cover panel.

Starting with the apparatus in the position shown in FIG. 7, hydraulic fluid is admitted to the cylinder 25, causing the piston rod 26 to extend from the cylinder and inducing, through the link 43, counterclockwise movement of the drive shaft 42. The spaced levers 68, which are pinned to shaft 42, are also moved in a counterclockwise direction, causing the reach arms 73 to extend and move the carrier 60 upwardly and laterally, the horizontally disposed upper surface S of the seal 80 being maintained during such movement in a horizontal plane, through the parallelogram linkage provided by the links 58, 59.

It is an important feature of the present invention that when the seal 80 attains the sealing position, closing the space O between the deck and the hatch cover, hydraulic pressure may be interrupted without in any way releasing the pressure with which the seal is impressed against the juxtaposed deck and hatch cover under faces. This highly advantageous relationship is achieved by shifting the pivot axis of the pins 75 connecting the reach arms 73 to the levers 68 from one side of a line L—L extending between the axis of the drive shaft 42 and the pin 77 connecting the reach arm to the seal carrier assembly 60, to the opposite side of said line.

In FIGS. 6 and 7 there is shown in dot and dash, the line L—L referred to. It will be readily seen in FIG. 7 that in the unsealed position, the axis of the pin 75 is to one side of the line L—L, whereas in FIG. 6, in the extended position of the piston 26, the axis of pin 75 has been shifted to a position slightly to the opposite side of said line.

The pivot point 75, in the sealed position, may be aptly referred to as being disposed in a "passed dead center" position. In such passed dead center position, it will be observed that the stresses in the compressed elastic seal 80 will tend to urge the reach arm connector pin 77 downwardly and, through the reach arm 73, tend to stress link 68 and drive shaft 42 toward a continued counterclockwise movement. However, at such passed dead center position the piston 26 and hydraulic cylinder 25 are so adjusted in their connection with the actuator mechanism that the piston 26 lies in its outward limiting bottomed position within the cylinder, thus resisting any such further counterclockwise movement of the drive shaft.

It will thus be seen that when the parts are in the sealing position shown in FIG. 6, the pressure in the hydraulic system may be relieved without any consequent relaxation of the sealing force.

A further advantage of the seal linkage hereinabove described lies in the fact that in addition to the seal that it provides, it also serves as a dogging or hatch locking mechanism.

Thus, the upward pressure exerted by the seal 80 against deck 10 (FIG. 6), tends also to force the panel downwardly so as to urge the foot portions 23 downwardly, limited by their engagement with the track 17. As a result the panels are locked between the tracks and the periphery of the hatch opening in the deck.

There has heretofore been described an actuator mechanism for operating a single seal. It will immediately be recognized that a series of seals will be required to close the space defined between adjacent hatch panels and between the edges of the various hatch panels and the adjacent deck portions.

There is shown in FIG. 8 a schematic view of the seal components only, employed in a hatch structure in accordance with FIG. 1. The specific seal structures shown in FIG. 8 may be varied to suit the specific panel arrangements desired and are described for illustrative purposes only.

In FIG. 10 there is shown a seal arrangement S' provided between the lead edges of the movable end panels of the first and second sets, i.e., between E and D. To achieve this transverse seal S', opposed flanges 90, 90 are welded to the undersurface 52 of the hatch cover panels. Compressible sections 91, 91 are supported within the confining space defined by the flanges 90, 90. As will be seen by comparison of FIGS. 11b showing the position of the panels just before closing, and the closed position 11a, the gasket components 91, 91 are initially formed to provide outward bulges, the bulges being compressed in the sealed position of the panels shown in FIG. 11a.

The corner structures of hatchways are typically rounded, as shown by the rounded coaming portions 92 (FIG. 1). In the illustrated embodiment all of the seal or gasket portions are carried by the hatch covers, with the exception of the arcuate corner seals 93, which are carried by gasket support flanges 94 mounted on the deck beam 21 adjacent the corners.

To the flange 94 is mounted an arcuate gasket support track 95 within which the arcuate seal sections 93 are mounted. It will be understood that portions of the seal 93 project beyond the supportive track 95 at both ends, the seal ends being inclined or beveled upwardly so as to merge with the downwardly inclined edge portions of seals 80 in the transition areas 96, 96 at the junctions of the fixed arcuate seal sections 93 and the lateral or articulated seals 80 (FIG. 8). In other words the uppermost edges of said seals and the lowermost edges of the moving seals 80 extend beyond the upermost edges, said seal edges being complementally beveled to mate in the closed position of the seals.

In FIGS. 11 and 11c there is shown the arrangement for the formation of the seals at the junction of the transverse extending gaskets 91 which are fixed to the hatch panels and the articulated or moving sections 80 carried by the seal carriers 60.

As best seen in FIG. 11, the T-shaped carrier bars 79 include at their end portions a generally L-shaped section 97 which may be of any suitable gasket material such as rubber, plastic or the like, the lateral edge 98 of which abuts against the adjacent end of the seal 80.

The inturned leg 99 of the L portion 97 is beveled as at 100, to mate with the undersurface 101 defined at an end of the transverse seal 91. Thus it will be understood that when the seal 80 and the L component 97 are shifted upwardly into engagement with the transverse seals 91, a tight connection in the beveled contacting area 100, 101 is formed.

The L-shaped and beveled components are repeated in each of the areas in which one of the transverse seals (TS as shown in FIG. 8) engages one of the articulated lateral seals 80.

When the panel sections are hinged together, as by hinges 20, seals are formed in surrounding relation to the said hinges. Such a surrounding seal is disclosed in FIGS. 12 and 13 wherein flanges 102, 103 support mating gaskets 104, the gaskets 104 being arranged in a generally U formation, the base of the U being shown in FIG. 12 and the legs of the U being shown in FIG. 13. Thus, the gaskets in the form of mating U's provide a sealing pocket about the hinges, preventing the ingress of water through the area of the hinges.

From the foregoing, it will be recognized that there is provided a dogging and gasketing mechanism for multiple panel hatch covers to seal the space between the panels themselves and between the panels and the hatchway. Since the gasket members, prior to opening of the hatchway, are articulated clear of the periphery of the hatch, there is no likelihood that the gaskets may be injured in the course of the hatch panels folding from the hatch sealing to the booked or hatch open position.

The novel gasket actuator assemblies, due to the passed dead center relation previously described, maintain the gaskets in stressed position without the requirement that hydraulic pressure be maintained within the linear acting hydraulic motors during the time that the hatch is in the hatchway sealing position.

While it is preferable to use a linear actuator, it is to be understood that other types could be used, such as rotary or screw types.

The compressive forces exerted by the seals against the undersurface of the deck adjacent the periphery of the hatch opening by reason of the reactive force against the panels, securely dogs the panels in closed position.

The sealing arrangement is ideally suited for use in a flush deck hatch installation, the seal in such instance, being effected at a point just beneath the deck surface, thus assuring that water will not have access to or compromise the hatch panel actuator assemblies.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A flush deck marine hatch cover assembly for a hatchway in the deck of a ship comprising a pair of spaced trackways adjacent the sides of said hatchway, a plurality of panel members hingedly connected to each other and to an end portion of said hatchway for translatory movement along said trackways between coplanar hatchway closing and folded hatch open positions, the upper surfaces of said panels in closed position being coplanar with and spaced from the edges of said deck defining the hatchway, powerized seal devices carried by said panels, along the edges thereof adjacent the edges of the hatchway, said seal devices including a seal carrier member, mounting means supporting said carrier members for movement toward and away from said space between said panel and hatchway edges, respectively between sealing and unsealing positions thereof, a resilient seal mounted on said carrier members and adapted in said sealing position to span and tightly press against said adjacent panel and hatchway edges, actuator links mounted on said panels for pivotal movement about a fixed pivot axis, actuator bars having a first pivotal connection at one end to said links and a second pivotal connection at the other end to said carrier members, and actuator means for rotating said links about said fixed axis to shift said first pivotal connection from one side of a line drawn between said pivot axis and said second pivotal connection, to the other side of said line.

2. A device in accordance with claim 1 wherein said seal is pressed tightly against said edge and deck portion when said first pivotal connection is disposed at said other side of said line.

3. A device in accordance with claim 2 wherein said actuator means comprises a linear acting hydraulic motor having a piston and cylinder, said piston being in an end limit position within said cylinder when said first pivot connection is disposed at said other side of said line.

4. A device in accordance with claim 1 wherein said mounting means for said carrier members includes parallelogram link portions whereby said carrier members are prevented from tilting in the course of their movement toward and away from said space.

5. A powerized dog and seal device for bridging and sealing the space between juxtaposed edge portions of a multi-panel flush deck hatch cover and a hatchway defining an opening in a deck when said panels are in closed position, comprising a plurality of seal carrier members disposed on said panels adjacent the periphery of said hatchway, mounting means supporting said carrier members for movement toward and away from said space, respectively, to sealing and unsealing positions thereof, resilient seal portions mounted on said carrier members, said seal portions in said sealing position being tightly pressed against said edge and deck portions defining said space, with the ends of said seal portions in tight engagement with each other to define a continuous seal area coinciding with said space, each said carrier member including an actuator assembly having an actuator link mounted for pivotal movement about a fixed pivot axis, an actuator bar having a first pivotal connection at one end to said link and a second pivotal connection at the other end to said carrier member, and actuator means for rotating said link about said fixed axis to shift said first pivotal connection from one side of a line drawn between said pivot axis and said second pivotal connection, to the other side of said line.

6. A device in accordance with claim 5 wherein said seal portions are pressed tightly against said juxtaposed edge portions and hatchway when said second pivotal connections are disposed at said other side of said line, and said actuator means comprises a linear acting hydraulic motor having a piston and cylinder, said piston being in an end limit position within said cylinder when said second pivot connection is disposed to said other side of said line.

7. A device in accordance with claim 5 wherein said mounting means for said carrier member includes parallelogram link portions whereby said carrier member is prevented from tilting in the course of said toward and away movement.

8. A device in accordance with claim 5 and including support means secured to said deck for maintaining said hatch cover in said closed position, the forces exerted by said seal portions in the seal position thereof reacting against support means.

9. A flush deck marine hatch cover assembly for a generally rectangular hatchway in the deck of a ship, comprising a spaced pair of parallel trackways disposed adjacent the side edges of said hatchway, a series of generally rectangular hatch panel members hingedly connected to each other along their transverse edges, an end panel of said series being hingedly connected to an end portion of said hatchway, said panels being mounted for translatory movement on said trackways between coplanar hatchway closing and folded hatch open positions, the edges of the upper surfaces of said panels in said closing position being coplanar with and spaced from the periphery of the hatchway, powerized means for shifting said panels between said closed and open positions, downwardly facing corner gasket means fixed beneath said deck at the corners of said hatchway, seal means mounted beneath said panels along the edges thereof, adjacent the periphery of said hatchway and actuator means for shifting said seal means upwardly to sealing position in said closed position of said panels to span the space defined between said panel edges and the periphery of the hatchway, said seal means also engaging end portions of said corner gasket means to define with said corner portions a complete peripheral seal about said hatchway.

10. A device in accordance with claim 9 wherein said end portions of said fixed corner gasket means are downwardly beveled and the end engaging portions of said seal means are upwardly beveled, said beveled portions of said gasket means and seal means being engaged in said sealing position.

11. A device in accordance with claim 9 wherein said transverse edges of adjacent panels include transversely extending lateral gasket members, the opposed lateral gasket members of adjacent panels being pressed into engagement with each other in said closing position, said gasket members terminating in spaced relation to the side edges of said panels, said seal means of said panels including transversely extending side portions shifted into sealing engagement with the end portions of said lateral gasket members in said sealing position.

12. A device in accordance with claim 11 wherein said end portions of said lateral gasket members and said side portions of said seal means are complementally beveled to engage in said sealing position.

13. A dog and seal device for bridging and sealing the space between juxtaposed edge portions of a multi-panel flush deck hatch cover and a hatchway defining an opening in a deck when said panels are in closed position, comprising a plurality of seal members disposed on said panels adjacent the periphery of said hatchway, mounting means supporting said seal members for movement toward and away from said space, respectively to sealing and unsealing positions thereof, said seal members in said sealing position being tightly pressed against said edge and deck portions defining said space.

References Cited
UNITED STATES PATENTS 2,729,185  1/1956  Kummerman ------- 114—201
3,324,817  6/1967  Olsson ------------ 114—202

ANDREW H. FARRELL, *Primary Examiner.*

U.S. Cl. X.R.

160—188; 292—256.5